United States Patent [19]

Bones et al.

[11] Patent Number: 5,279,908
[45] Date of Patent: Jan. 18, 1994

[54] ELECTROCHEMICAL CELL

[75] Inventors: Roger J. Bones, Oxfordshire; David A. Teagle, Wiltshire; Marion R. Rance, Oxon, all of England

[73] Assignee: Programme 3 Patent Holdings, Luxembourg

[21] Appl. No.: 740,372

[22] Filed: Aug. 5, 1991

[30] Foreign Application Priority Data

Aug. 7, 1990 [GB] United Kingdom ............ 9017284

[51] Int. Cl.$^5$ ............................................. H01M 2/00
[52] U.S. Cl. .................................. 429/102; 429/103; 429/104
[58] Field of Search .................... 429/104, 103, 102

[56] References Cited

U.S. PATENT DOCUMENTS

| | | |
|---|---|---|
| 4,049,885 | 9/1977 | Mitoff . |
| 4,102,042 | 7/1978 | Weiner ................................ 429/191 |
| 4,197,363 | 4/1980 | Topouzcan et al. ................. 429/104 |
| 4,279,974 | 7/1981 | Nishio . |
| 4,405,696 | 9/1983 | Fischer et al. ...................... 429/104 |
| 4,424,262 | 1/1984 | von Alpen et al. . |
| 4,568,502 | 2/1986 | Theodore et al. . |
| 4,656,102 | 4/1987 | Hasenaur et al. . |
| 4,772,875 | 2/1988 | Wright . |
| 4,774,156 | 9/1988 | Bones et al. . |
| 4,797,332 | 1/1989 | Barrow et al. . |
| 4,797,333 | 1/1989 | Coetzer et al. . |
| 4,913,754 | 4/1990 | Duncan et al. . |
| 4,925,749 | 5/1990 | Wright . |
| 4,975,343 | 12/1990 | Coetzer . |

FOREIGN PATENT DOCUMENTS

| | | |
|---|---|---|
| 0064234 | 11/1982 | Fed. Rep. of Germany . |
| 2315778 | 1/1977 | France . |
| 2662305 | 11/1991 | France . |
| 1495706 | 12/1977 | United Kingdom . |
| 2018013 | 3/1978 | United Kingdom . |
| 1505987 | 4/1978 | United Kingdom . |
| 2018013A | 10/1979 | United Kingdom . |
| 2193837A | 2/1988 | United Kingdom . |
| 2208033B | 2/1989 | United Kingdom . |
| 2210612 | 6/1989 | United Kingdom . |
| 2210612A | 6/1989 | United Kingdom . |
| 2214344A | 8/1989 | United Kingdom . |
| 2226181A | 6/1990 | United Kingdom . |
| 2240424A | 7/1991 | United Kingdom . |

OTHER PUBLICATIONS

Pett, et al., "Plate-Type Beta Alumina Electrolytes for an Advanced Sodium-Sulfur Cell Design," Am. Ceram. Soc. Bull., vol. 64(4), 589-92 (1985).
Nelson, "Advanced High Temperature Batteries" (date unknown).
Silverman, "Development Program for Solid Electrolyte Batteries," Research Project 127-2; Interim Report for the Period Jul. 1, 1974 to Jun. 30, 1975, prepared by TRW Systems Group, TRW Inc.
Seo, et al. "Investigation of High Temperature Battery Systems," prepared for Army Electronics Command, Jan. 1974.

Primary Examiner—Prince Willis, Jr.
Assistant Examiner—M. Nuzzolillo
Attorney, Agent, or Firm—Arnold, White & Durkee

[57] ABSTRACT

An electrochemical cell 10 housing a cylindrical housing 12 and a solid electrolyte separator tube 24 located concentrically therein, dividing the housing into an electrode compartment in the tube and an electrode compartment outside the tube. The cell has a solid electrolyte holder 36, 74 located in the tube and containing active electrode material 54. One of the electrode compartments contains active anode material, the other containing active cathode material. The electrode material in the holder is in electronic contact with the electrode material 54 in the housing outside the tube.

9 Claims, 4 Drawing Sheets

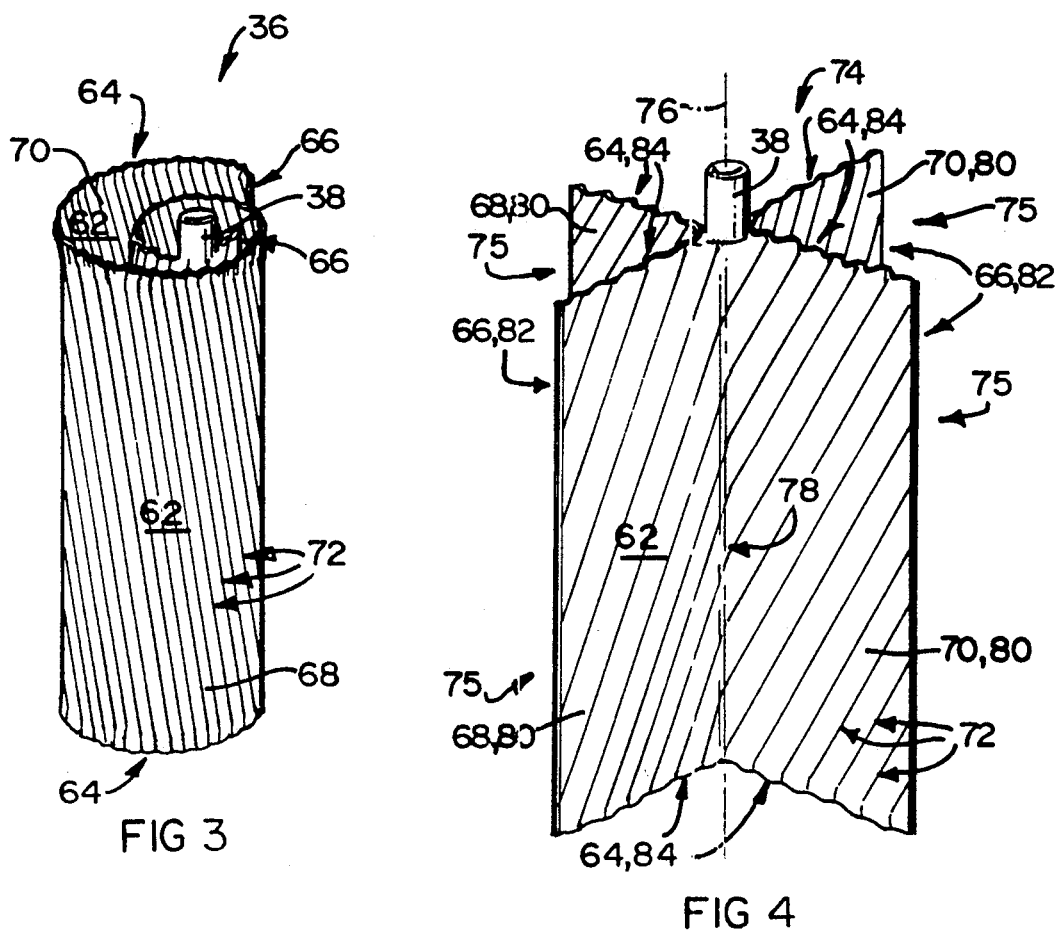
FIG 3
FIG 4
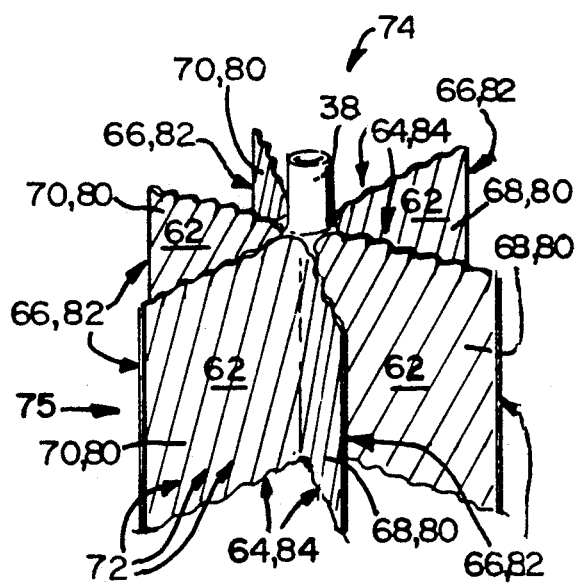
FIG 5

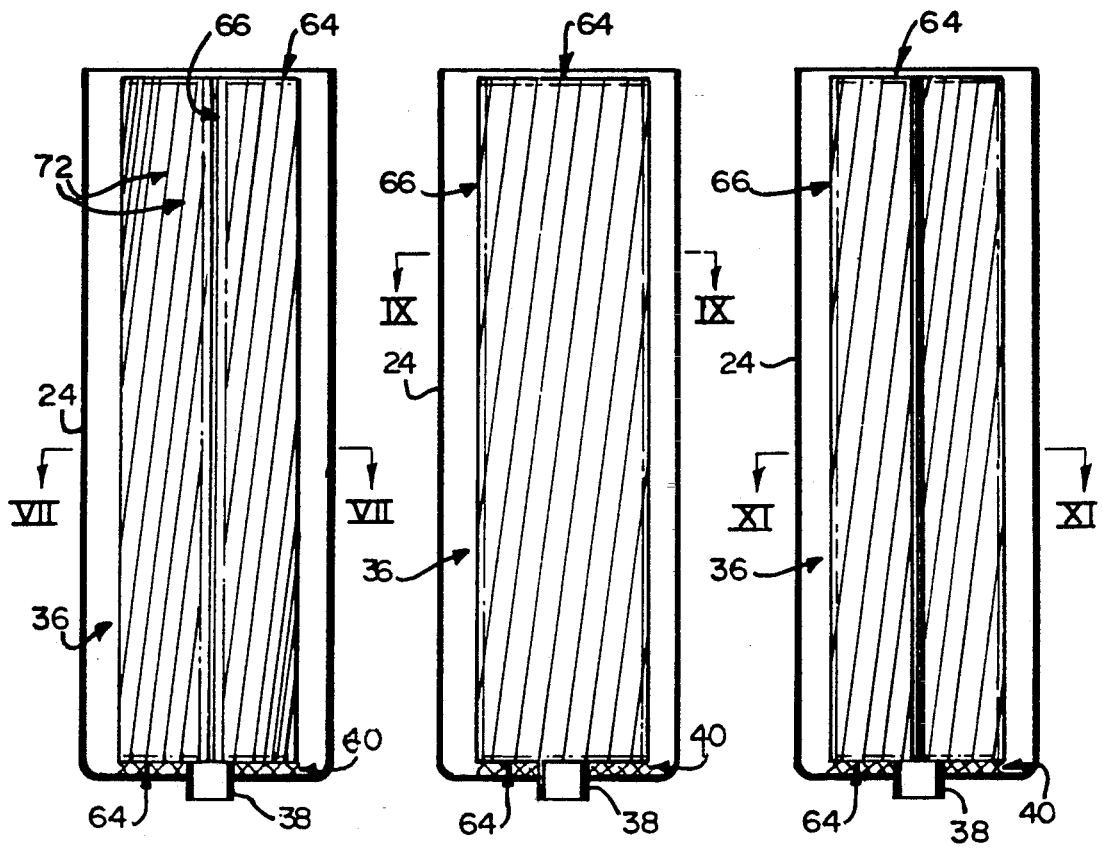
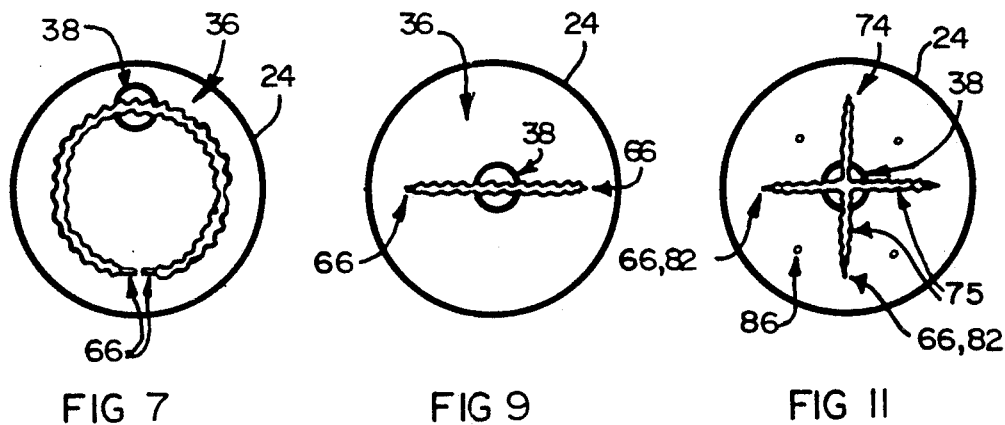

ELECTROCHEMICAL CELL

THIS INVENTION relates to an electrochemical cell.

According to the invention there is provided an electrochemical cell which comprises a cylindrical housing and, located concentrically within the housing, a solid electrolyte separator tube which divides the interior of the housing into an inner electrode compartment in the interior of the separator tube and an outer electrode compartment between the separator tube and the housing, one of the electrode compartments containing active anode material and the other containing active cathode material, the separator tube further having, located in its interior, an electrode holder in the form of an envelope of solid electrolyte material containing, in its interior, the same electrode material as is contained in the outer electrode compartment, the electrode material in the holder being in electronic contact with the electrode material in the outer electrode compartment.

The holder may be an anode holder containing active anode material which is liquid at the cell operating temperature, the inner electrode compartment being a cathode compartment containing active cathode material and the outer electrode compartment being an anode compartment containing said active anode material.

In a particular embodiment, the cell may have an upright condition in which the housing extends upwardly from a base provided thereon for supporting the cell in said upright condition, the separator tube having an open upper end which is closed off by a closure and from which upper end it is suspended in the housing, and the separator tube having a closed lower end through which a feedthrough projects from the holder into the outer electrode compartment, the feedthrough placing the interior of the holder in communication with the interior of the outer electrode compartment, and the electrode material in the holder and outer electrode compartment being liquid at the operating temperature of the cell.

The cell may be a so-called sodium/sulphur cell, having an operating temperature at which its anode and cathode are molten, the anode being sodium and the cathode being sulphur/sodium sulphide/sodium polysulphide. Instead, the cell may be of a type having an alkali metal anode and an operating temperature at which the anode is molten, the cathode comprising a solid electronically conductive porous matrix impregnated with a molten salt electrolyte and comprising, in its charged state, a suitable transition metal halide dispersed in the porous interior of the matrix. Naturally, in each case, the separator tube and the electrode holder will be a conductor of ions of the alkali metal of the anode.

The active anode material may thus be sodium, the cell having an operating temperature at which the sodium is molten, the material of the holder being selected from $\beta$-alumina and $\beta''$-alumina.

The holder may be radially symmetrical, and may be in the form of a flattened laterally compressed envelope. For example, the holder may be circumferentially curved about an axis which is centrally located in the separator tube. Instead, the holder may comprise a plurality of fins radiating outwardly from an axis which is centrally located in the separator tube, and the fins may be spirally curved about said central axis.

The holder may be made up of a plurality of panels of solid electrolyte material sealingly connected together along the peripheries thereof, the panels having ribs or corrugations and at least some of the panels being arranged in pairs which at least in part are opposed and face-to-face with each other In this construction, each rib or corrugation of each panel of each said pair may cross over a plurality of the ribs or corrugations of the other panel of said pair.

Electrode holders suitable for the present invention and methods of making them, are described in more detail in the Applicant's co-pending South African, British, United States, French, German and Japanese Patent Applications which are respectively Nos. 91/3608, 91105627, 699 810, 91.05952, P.41 16 079.7 and 028971/91. These co-pending applications also describe, in more detail, suitable cell electrochemistries for the cell of the present invention, with regard to anode electrochemistry, cathode electrochemistry, methods of loading such cells, separator and holder manufacture and electrochemistry, etc. Suitable holders are also described in published British Patent Application 2240424 in the name of Lilliwyte Societe Anonyme.

The invention will now be described, by way of example, with reference to the accompanying schematic drawings, in which:

FIG. 3 shows a three dimensional view of an electrode holder suitable for the cell of FIG. 1;

FIG. 4 shows a three dimensional view of a composite electrode holder suitable for the cell of FIG. 1;

FIG. 5 shows a view similar to view similar to FIG. 4 of another electrode holder suitable for the cell of FIG. 1;

FIG. 6 shows a sectional side elevation of part of a variation of the cell of FIG. 1;

FIG. 7 shows a sectional plan view of the cell part of FIG. 6, in the direction of line VII—VII in FIG. 6;

FIG. 8 shows a view similar to FIG. 6 of part of another variation of the cell of FIG. 1;

FIG. 9 shows a sectional plan view of the cell part of FIG. 8, in the direction of line IX—IX in FIG. 9;

FIG. 10 shows a view similar to FIG. 6 of the part of yet another variation of the cell of FIG. 1;

FIG. 11 shows a sectional plan view of the cell part of FIG. 10, in the direction of line XI—XI in FIG. 10;

Figure 1:
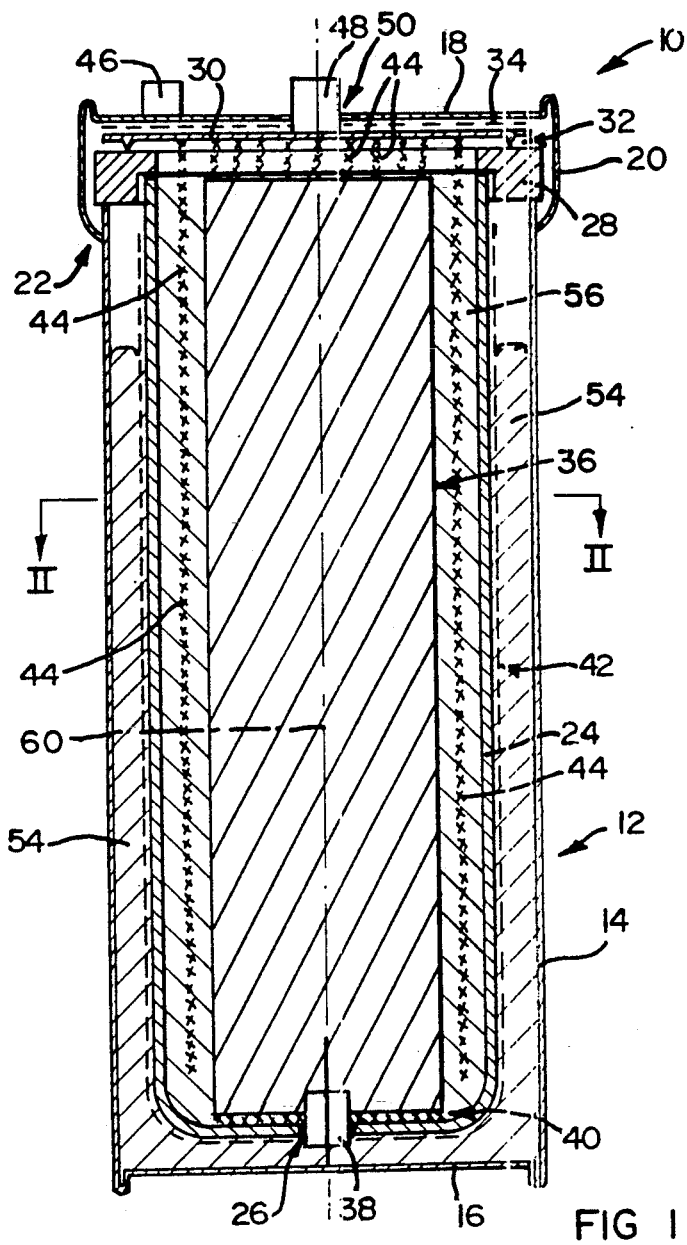
FIG. 1 shows a sectional side elevation of an electrochemical cell in accordance with the invention.
Figure 2:
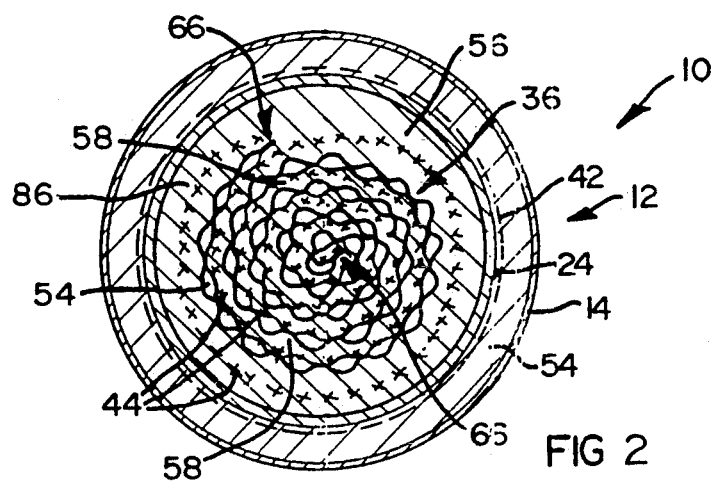
FIG. 2 shows a sectional plan view, in the direction of line II—II in FIG. 1, of the cell of FIG. 1.

In FIGS. 1 and 2, an electrochemical cell in accordance with the present invention is generally designated 10. The cell 10 is shown having a cylindrical housing, e.g. of steel, designated 12 and having a cylindrical side wall 14, a circular floor 16 welded to the side wall 14 and a circular cap or disc closure 18 welded to a skirt 20 whose lower periphery is in turn welded at 22 to the side wall 14 at a position adjacent the top of the side wall 14. The floor 16 provides a base on the housing 12 for supporting the cell 10 in an upright condition in which the floor 16 is horizontal and the cell extends vertically upwardly.

A tubular $\beta''$-alumina separator 24 is provided concentrically in the housing 12, the separator tube 24 having a closed lower end and an open upper end from which it is suspended. The lower end of the separator tube has a central circular opening at 26. The upper open end of the separator tube 24 is hermetically glass welded to a α-alumina insulating ring 28.

A closure in the form of a disc-shaped metal seal 30 closes off the upper end of the tube 24, being provided on the lower face thereof with a circular sealing edge 32 which seals against the upper surface of the ring 28. The seal 30 is held in sealing engagement with the ring 28 via the sealing edge 32 by an insulating disc 34 which separates said seal 30 from the closure 18, suitable force being exerted on the seal 30 via the insulating disc 34 by means of the closure 18, the housing being welded together in a fashion to provide such force.

In the interior of the separator tube 24 is located an electrode holder 36 of the type shown in FIG. 3, made of a flat envelope which has been coiled, and having a feedthrough 38 in a more or less central position.

In the cell 10 the feedthrough 38 is arranged so that it projects downwardly through the central opening 26 in the closed lower end of the separator tube 24. The spirally coiled lower end edge of said envelope 36 is glass welded at 40 to the inner surface of the lower closed end of the tube 24, and the outer periphery of the feedthrough 38 is sealingly welded into the periphery of the opening 26. This can be achieved by locating the envelope 36 in the separator tube 24 with glass frit in the bottom of the tube 24 and heating the tube to melt the glass, the amount of frit and heating being selected so as to seal the feedthrough 38 in position and weld the envelope 36 at 40 to the tube 24.

The cell 10 is shown with a woven sock 42 of steel mesh wicking material enclosing and in abutment with the outer surface of the separator tube 24 and a spirally wound woven sheet 44 of steel mesh current collecting material wound helically and coaxially with the coils of the envelope 36, the woven steel current collecting sheet 44 being located around the curved periphery of the envelope 36, and coiled into the radial spaces between the coils of the envelope 36. The woven current collecting sheet 44 extends vertically over the full height of the envelope 36, and has its upper edge fast with the seal 30, which is similarly of steel.

The cell is provided with an anode terminal 46 fast with the disc 18 and a cathode terminal 48 fast with the seal 30 and projecting upwardly from the seal 30 through a central opening 50 in the disc 18, the terminal 48 being electrically insulated from the disc 18.

The annular space between the tube 24 and the housing wall 14 is shown containing molten sodium anode material 54, and the interior of the envelope 36 likewise contains molten sodium anode material 54, said interior of the envelope 36 being in communication with the annular space between the tube 24 and housing 12 via the feedthrough 38. Inert gas under pressure is provided in an upper portion of the annular space between the tube 24 and housing 12, to ensure that the interior of the envelope 10 remains filled with molten sodium anode material at all times.

The space 56 between the tube 24 and envelope 36, and the radial spaces 58 between the coils of the envelope 36, are filled with cathode material. This cathode material comprises an electronically conductive, electrolyte permeable porous matrix of e.g. Fe or Ni, saturated with molten $NaAlCl_4$ liquid electrolyte. The porous spaces in the interior of the matrix have finely divided $FeCl_2$ or $NiCl_2$, as the case may be, dispersed therein, together with finely divided NaCl so that in the fully charged state of the cell the molar proportion of $AlCl_3$ in the electrolyte is never greater than the molar proportion of NaCl therein.

U.S. Pat. Nos. 4 722 875 and 4 797 333, teach that cathodes of this type can be made by initially charging a powder mixture into said spaces between the envelope 36 and tube 24, in the radial spaces between the coils of the envelope 36, followed by charging of the cell. In this case the interior of the envelope 36 and the annular space between the tube 24 and housing 12 can be evacuated prior to the initial charge cycle, in which case inert gas under pressure can be dispensed with but the interior of the envelope 36 should instead be provided with an aluminium wire current collector extending over its full depth, as shown schematically by a chain-dotted line at 60.

In FIG. 3 the envelope 36 is shown to be laterally compressed and is of $\beta''$-alumina It is of spirally wound shape. The envelope 36 has a pair of opposed major faces 62 sealed together along substantially the whole of the periphery of the envelope, which periphery is provided by its end edges 64 and its side edges 66. The envelope is coiled about a central axis parallel to its side edges 66, the coils of the envelope being spaced from each other.

The major faces 62 are provided by a pair of sheets 68, 70 of unitary sintered $\beta''$-alumina ceramic. Each sheet 68, 70, is corrugated by a plurality of substantially sinusoidal corrugations 72 having crests and valleys between the crests. The corrugations 72 extend, on each of the sheets 68, 70 at an acute angle of about 10° relative to the side edges 66, so that said corrugations 72 intersect the end edges 64 at an acute angle of about 80°.

The sheets 68, 70 are thus arranged so that the corrugations 72 of the sheet 68 cross over the corrugations 72 of the sheet 70 at an angle of 20°.

The sheets 68, 70 are in abutment, face-to-face, so that they touch each other at a multiplicity of points where the corrugations cross one another.

It follows, importantly, that, although the sheets 68, 70 are in face-to-face abutment, the entire interior volume of the envelope 36 is, in all its parts, in communication with itself, and no part of said interior volume is isolated from any other part thereof. The interior space of the envelope 36 is defined by the valleys between the corrugations 72 on the inner opposed surfaces of the sheet 68, 70.

At the end edges 64 of the envelope 36, the corrugations 72 of the two sheets 68, 70 are substantially in phase with each other. Adjacent said end edges 64, the sheets 68, 70 converge towards each other in a longitudinally outward direction, so that, at and immediately adjacent said edges, the corrugations 72 of the sheet 68 nest snugly within the corrugations 72 of the sheet 70, in face-to-face abutment, where the sheets 68, 70 are sealed to each other. The sheets 68, 70 are substantially identical to each other, facilitating mass production thereof.

The envelope 36 has a feedthrough 38 in the form of a sintered ceramic hollow tube of $\beta$-alumina. The feedthrough 38 provides a means for feeding molten sodium anode material into the envelope 36, during loading of an electrochemical cell in which the envelope 36 forms a liquid sodium anode holder. The feedthrough 38 can also be employed as an inlet to the interior of the envelope 36, e.g. when the opposed inner faces of the sheets 68, 70 are to be treated for example by doping thereof with a transition metal oxide to improve the wettability thereof by sodium, as described in U.S. Pat. No. 4 797 332; and for charging a suitable getter such as magnesium into the interior of the envelope as described by British published Patent Application 2193837.

The feedthrough is shown circular in cross-section and is located adjacent one end of one of the end edges 64.

To make the envelopes 30 of FIG. 3, a mixture is made up of $\beta''$-alumina of about $<50$ $\mu$ particle size, binder, plasticizer and solvent. The binder, plasticizer and solvent will be of the type described in British Patent 1 274 211 and can be employed in the proportions set forth in the following table:

TABLE

| Constituent | Mass (g) |
|---|---|
| $\beta$-Alumina Powder | 80–120 |
| Binder | 14–18 |
| Plasticizer | 5–10 |
| Solvent | 0–5 |

When mixed together the constituents will form a semi-dry powder mixture. This is fed through a hot rolling machine having multiple rollers at 50°–150° C., depending on the composition employed, at which temperature the binder will be plastic. The mixture will be rolled to form a flat sheet of thickness of about 0,5–1,5 mm, and having a density after rolling of about 2,1–2,3 g/cm³. These sheets will then be rolled by a sinusoidally profiled roller, to make the corrugated sheet material for the sheets 68, 70, which can then be cut therefrom. The sheets will be cut so that they can be placed, in face-to-face abutment with each other, in the arrangement shown in FIG. 3, with their side edges 66 in register and their end edges 64 in register, and in particular so that, at the end edges 64, the corrugations 72 of each of the sheets are in phase and in register with each other, so that they can nest face-to-face in each other in abutment.

The side edges 66 of the envelope can then be sealed at e.g. 50°–70° C. using a flat roller and hand pressure; the feedthrough 38 can be pinched and sealed at 50°–70° C. between the end edges of the sheets; and, while the sheets are plastic, their end edges and the adjacent material can be urged into face-to-face nesting abutment and sealed together by a pair of suitably sinusoidally profiled rollers.

A free-standing green envelope will be obtained which can then be heated and fired, e.g. according to the following regime:
Ambient - 450° C. at 10° C./hr
450° C.-1600° C. at 180° C./hr
1600° C.-1617° C. at 70° C./hr
1617° C. - hold for 15 minutes
1617° C.-1000° C. at 240° C./hr
1000° C. - ambient at 360° C./hr This firing regime results in a monolithic, unitary sintered $\beta''$-alumina envelope comprising about 98% by mass of $\beta''$- alumina having a density of 3,1–3,2 g/cm³, the envelope exhibiting a linear shrinkage of about 17–18% upon firing. The end edges and side edges of the sheets 68, 70 will be hermetically sealed to each other respectively to provide the edges 64, 66 of the envelope, and the end edges of the sheets 68, 70 at the end edge 64 of the envelope which receives the feedthrough 38, will be hermetically sealed to said feedthrough.

The envelope will be spirally coiled, while it is in a plastic state, before firing. In this regard it is to be noted that the green envelope is preferably supported on one of its end edges during firing, to permit reliable, even and complete volatilization of the binder, plasticizer and solvent during heating and before sintering takes place. This is facilitated by the shape of the envelope which can easily be supported on its coiled end edge 14 which does not have the feedthrough 38.

Turning to FIG. 4, which employs the same numerals for the same parts as FIG. 3, unless otherwise specified, reference numeral 74 generally designates a composite electrode holder in accordance with the present invention. The holder 74 is cruciform in cross-section/end elevation, and can be regarded as four flat envelopes joined together at one of the side edges 66 of each end thereof, so that they provide fins 75 which radiate from a central axis 76, being equally circumferentially spaced by an angle of 90°. The sheets 68 and 70 of each flat envelope are not sealed together at said inner side edges so that each flat envelope communicates via a slot between its sheets 68 and 70 at its inner side edge with a central space surrounding and coaxial with said axis 76.

The holder 74 can in principle be made by forming four flat envelopes, but without separate feedthroughs and without sealing their sheets 68, 70 together at one of the side edges 66 of each thereof, to leave said slots. These envelopes can then be arranged in the cruciform arrangement shown in FIG. 4 and the envelopes can be sealed at 78 to one another at their inner (slotted) side edges 66 at the peripheries of said slots to form the holder 74 in unitary and monolithic fashion. A single common feedthrough 38 can then be provided, as shown in FIG. 4, into one end of the central space surrounding the axis 76.

A preferred way of making the holder 74, however, is from four flat corrugated sheets. These corrugated sheets, while plastic, are each bent, about an axis (at the position 78 in FIG. 4) parallel to their side edges 66, through approximately 90°. They are then arranged together to form the structure shown in FIG. 4, the four sheets in question each being designated in FIG. 4 by reference numeral 80, their side edges being located at 82. These side edges at 82 can then be sealed together in the same fashion as described above for the side edges 66 in FIG. 3 and their end edges, as shown at 84 in FIG. 4, can be sealed together in the same fashion as described above for the end edges 64 in FIG. 3.

The central space surrounding the axis 76 can then be closed off, at each end of the holder 74, by a plug or patch of $\beta''$-alumina sheeting of the same type as is used to make the corrugated sheets. At one end of this central space, the plug can be replaced by the common feedthrough 38, to which the periphery of said open end of the central space is sealed while the sheets are plastic, or a patch with an opening can be used, the periphery of the opening in the patch being sealed to the feedthrough 38.

The aforegoing manipulations will be carried out with the sheets in a plastic state, and after they have been sealed together in a plastic state, the holder can be sintered as described above.

Turning to FIG. 5, a similar construction to that shown in FIG. 4 is again shown, and again, unless otherwise specified, the same reference numerals refer to the same parts. The essential difference between the holder 74 of FIG. 5 and that of FIG. 4 is that the holder of FIG. 5 employs six sheets 80. The sheets 34,80 instead of being bent through about 90°, are bent through about 60°, so that they can be arranged together as shown to provide a star-shaped holder in cross-section or end elevation, with six equally radially spaced limbs or points spaced apart by 60°.

FIGS. 6 and 7 show a variation of part of the construction of the cell of FIGS. 1 and 2. The same reference numerals are used for the same parts in FIGS. 6 and 7 as are used in FIGS. 1 and 2, the tube 24 and envelope 36 being shown. The major difference between the construction of FIGS. 6 and 7 compared with that of FIGS. 1 and 2 is that the envelope 36 is, prior to sintering thereof, bent from a flat envelope to be circumferentially curved about an axis parallel to its side edges 16 into an annular or cylindrical shape of circular end view outline, as opposed to a spiral shape, the side edges of the envelope 36 being shown at 66 and the feedthrough 38 being centrally positioned through one of the end edges 64 of the envelope 36.

In the case of FIGS. 6 and 7 the cathodes will be provided with appropriate current collecting sheets similar to that shown at 44 in FIGS. 1 and 2 but not shown in FIGS. 6 and 7, located both inside the hollow interior of the cylinder provided by the envelope 36, and in the annular space between the envelope 36 and tube 24.

In the case of FIGS. 8 and 9, which show a further variation of the construction shown in FIGS. 6 and 7, an elongated flat rectangular envelope 36 is shown with its feedthrough 38 centrally positioned through one of its end edges 64, and accordingly passing centrally through the closed lower end of the tube 24. In FIGS. 8 and 9 the cathode and current collecting sheet (see 44 in FIGS. 1 and 2) will merely be on opposite sides of, and face-to-face with, the envelope 36.

The construction shown in FIGS. 10 and 11 is again essentially similar to that shown in FIGS. 6 to 9, unless otherwise specified. In the case of FIGS. 10 and 11 a composite holder 74 of the type shown in FIG. 4 is located in the tube 24, the cathode being located in the four segmented zones defined between the radiating fins 75 of the envelope 74; and the cathode current collector, instead of being a sheet, is in the form of four metal strips 86 extending the length of the holder 74 and being connected to the seal (see 30 in FIG. 1).

Figure 12:
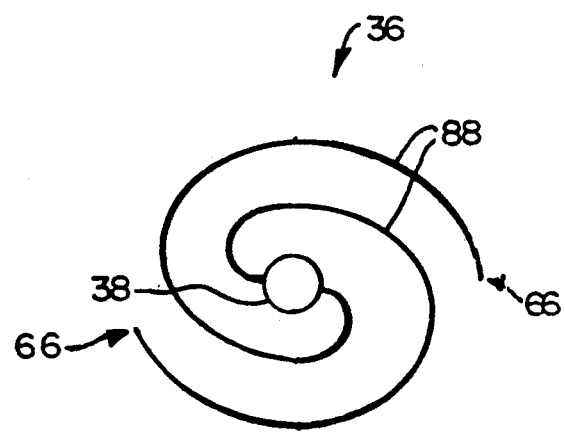
FIG. 12 shows a diagrammatic plan view of a variation of the envelope of the cell of FIG. 1.

In FIG. 12, the envelope is again designated 36 and the same reference numerals are used as in FIG. 3, unless otherwise specified. In FIG. 12, the envelope 36 is shown having two portions 88 on opposite sides of the feedthrough 38, each portion 88 spiralling helically inwardly from its side edge 66 towards the centre, where the feedthrough 38 is located.

Figure 13:
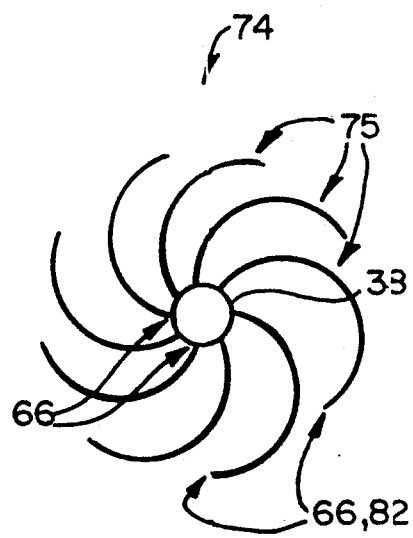
FIG. 13 shows a view similar to FIG. 12 of a further variation of the holder of the cell of FIG. 1.

In FIG. 13 the same reference numerals are used as in FIG. 4, unless otherwise specified. In FIG. 3 there are fins 75 radiating in equally circumferentially spaced fashion from the central axis 76 (see also FIG. 4). The fins 75 in turn spiral helically inwardly from their side edges 66, 82 in a fashion similar to the portions 88 of FIG. 12

We claim:

1. In an electochemical cell which comprises a cylindrical housing and, located concentrically within the housing, a solid electrolyte separator tube which divides the interior of the housing into an inner electrode compartment in the interior of the separator tube and an outer electrode compartment between the separator tube and the housing, one of the electrode compartments respectively containing active anode material and the other containing active cathode material, the separator tube further having, located in its interior, an electrode holder in the form of an envelope of solid electrolyte material containing, in its interior, the same electrode material as is contained in the outer electrode compartment, the electrode material in the holder being in electronic contact with the electrode material in the outer electrode compartment, the improvement whereby the electrode holder comprises a plurality of panels of solid electrolyte material sealingly connected together along the peripheries thereof, each panel having an inner surface provided with a plurality of ribs or corrugations and at least some of the panels being arranged in opposed pairs, the panels of which pairs are face-to-face with each other, each panel of each said pair having a plurality of said ribs or corrugations which cross over a plurality of the ribs or corrugations of the other panel of said pair.

2. A cell as claimed in claim 1, in which the holder is an anode holder containing active anode material which is liquid at the cell operating temperature, the inner electrode compartment being a cathode compartment containing active cathode material and the outer electrode compartment being an anode compartment containing said active anode material.

3. A cell as claimed in claim 1, which cell has an upright condition in which the housing extends upwardly from a base provided thereon for supporting the cell in said upright condition, the separator tube having an open upper end which is closed off by a closure and from which upper end it is suspended in the housing, and the separator tube having a closed lower end through which a feedthrough projects from the holder into the outer electrode compartment, the feedthrough placing the interior of the holder in communication with the interior of the outer electrode compartment, and the electrode material in the holder and outer electrode compartment being liquid at the operating temperature of the cell.

4. A cell as claimed in claim 1, in which the active anode material is sodium, the cell having an operating temperature at which the sodium is molten, the material of the holder being selected from $\beta$-alumina and $\beta''$-alumina.

5. A cell as claimed in claim 1, in which the holder is radially symmetrical.

6. A cell as claimed in claim 1, in which the holder is in the form of a flattened laterally compressed envelope.

7. A cell as claimed in claim 5, in which the holder is circumferentially curved about an axis which is centrally located in the separator tube.

8. A cell as claimed in claim 5, in which the holder comprises a plurality of fins radiating outwardly from an axis which is centrally located in the separator tube.

9. A cell as claimed in claim 8, in which the fins are spirally curved about said central axis.

* * * * *

UNITED STATES PATENT AND TRADEMARK OFFICE
CERTIFICATE OF CORRECTION

PATENT NO. : 5,279,908

DATED : January 18, 1994

INVENTOR(S) : Roger J. Bones et al.

It is certified that error appears in the above-identified patent and that said Letters Patent is hereby corrected as shown below:

In Column 7, line 61 (claim 1), please delete "electochemical" and insert therefor -- electrochemical --.

Signed and Sealed this

Twenty-third Day of August, 1994

Attest:

BRUCE LEHMAN

Attesting Officer

*Commissioner of Patents and Trademarks*